(12) United States Patent
Bloebaum

(10) Patent No.: US 6,535,815 B2
(45) Date of Patent: Mar. 18, 2003

(54) POSITION UPDATING METHOD FOR A MOBILE TERMINAL EQUIPPED WITH A POSITIONING RECEIVER

(75) Inventor: Leland Scott Bloebaum, Cary, NC (US)

(73) Assignee: Telefonaktiebolaget L. M. Ericsson, Stockholm (SE)

(*) Notice: Subject to any disclaimer, the term of this patent is extended or adjusted under 35 U.S.C. 154(b) by 35 days.

(21) Appl. No.: 09/747,904

(22) Filed: Dec. 22, 2000

(65) Prior Publication Data

US 2002/0082774 A1 Jun. 27, 2002

(51) Int. Cl.[7] .......................... G01S 13/00; H04B 7/185
(52) U.S. Cl. ..................... 701/213; 701/200; 73/178 R; 340/988; 340/989
(58) Field of Search ................ 701/213, 200; 73/178 R; 340/988, 989

(56) References Cited

U.S. PATENT DOCUMENTS

| | | | | |
|---|---|---|---|---|
| 5,508,707 A | * | 4/1996 | LeBlanc et al. | 342/457 |
| 5,663,734 A | * | 9/1997 | Krasner | 342/352 |
| 5,867,109 A | * | 2/1999 | Wiedeman | 370/328 |
| 5,870,741 A | * | 2/1999 | Kawabe et al. | 434/112 |
| 5,874,914 A | * | 2/1999 | Krasner | 342/357.12 |
| 5,884,214 A | * | 3/1999 | Krasner | 701/207 |
| 6,002,936 A | * | 12/1999 | Roel-Ng et al. | 455/456 |
| 6,075,987 A | | 6/2000 | Camp, Jr. et al. | |
| 6,104,931 A | * | 8/2000 | Havinis et al. | 455/433 |
| 6,115,605 A | * | 9/2000 | Siccardo et al. | 340/7.45 |
| 6,122,499 A | * | 9/2000 | Magnusson | 379/35 |
| 6,133,874 A | | 10/2000 | Krasner | |
| 6,167,266 A | * | 12/2000 | Havinis et al. | 455/432 |
| 6,204,808 B1 | * | 3/2001 | Bloebaum et al. | 342/357.07 |
| 6,295,023 B1 | * | 9/2001 | Bloebaum | 342/357.06 |
| 6,321,090 B1 | * | 11/2001 | Soliman | 370/331 |

FOREIGN PATENT DOCUMENTS

| | | |
|---|---|---|
| EP | 0902300 A | 3/1999 |
| WO | WO 00/92610 A | 11/2000 |

* cited by examiner

Primary Examiner—William A. Cuchlinski, Jr.
Assistant Examiner—Olga Hernandez
(74) Attorney, Agent, or Firm—Coats & Bennett, P.L.L.C

(57) ABSTRACT

A mobile terminal equipped with a GPS receiver uses a quality of service parameter to determine whether to request aiding data from a location server connected to the mobile communication network. When a request is received by the mobile terminal for its current position, the mobile terminal determines a desired quality of service. Based on the desired quality of service, the mobile terminal then determines whether aiding data currently stored in its memory is sufficient to meet the specified quality of service. If so, the mobile terminal computes its current location using aiding data currently stored in its memory. If not, the mobile terminal may request aiding data from the network or acquire current aiding data from a GPS satellite.

20 Claims, 3 Drawing Sheets

POSITION UPDATING METHOD FOR A MOBILE TERMINAL EQUIPPED WITH A POSITIONING RECEIVER

BACKGROUND OF THE INVENTION

The present invention relates generally to mobile terminals equipped with a positioning receiver, such as a GPS receiver, and, more particularly, to a method of optimizing the time needed to compute position estimates based on a specified quality of service.

GPS receivers typically determine their location by computing distances between the GPS receiver and a multiplicity of space-based satellites. The space-based satellites transmit navigation messages containing, inter alia, timing data, satellite ephemeris data, almanac data, and correction data. The GPS receiver searches for and acquires the GPS signals transmitted from the space-based satellites, reads the information contained in the GPS signal, and then uses this information to compute its location. This process can be time consuming, often requiring several minutes. For some applications, this can be a prohibitive amount of time.

The integration of GPS receivers with mobile terminals has enabled the GPS receiver to utilize aiding data provided by a land-based mobile communication network to speed up position estimating. This aiding data can include precise orbits (ephemeris), long-term orbital information (almanac), corrections for clock and ionospheric propagation delays, a list of satellites "in view", time information, as well as other data.

There are several prior art solutions that address the problem of providing aiding data to a GPS receiver integrated with a mobile terminal. These solutions may be categorized as mobile-based, in which the mobile terminal computes its own position, and network-based, in which the network computes the position of the mobile terminal based on measurements transmitted by the mobile terminal to the network. U.S. Pat. No. 5,365,450 discloses an example of a mobile-based solution. In this patent, the network transmits satellite ephemeris data, timing information, or other aiding data to the mobile terminal, which then utilizes this information to acquire GPS satellite signals and to compute a position estimate. There are also several existing U.S. patents, including U.S. Pat. Nos. 5,884,214; 5,874,914; and 5,663,734, which describe network-based solutions. Generally, network-based solutions are based on transmitting estimates of code phase and Doppler for satellites that are visible to a reference location known to be in the vicinity of the mobile terminal. The mobile terminal uses this aiding data to acquire the satellite signals and return measurements to the network, without utilizing ephemeris or other data that is provided by the GPS satellites.

In some cases, the network may provide a broadcast service whereby a server attached to the network can transmit aiding data to all mobile terminals within the network. Alternately, the network may allow the server to broadcast unique aiding data to different geographical regions in the network. A broadcast service is a very efficient way to deliver data that is required by many different mobile terminals. However, there are some circumstances in which the server may not have access to such a broadcast facility. For example, the network may not provide a broadcast facility or it may be fully utilized by other information services. Furthermore, the mobile terminal may not always be able to receive the broadcast from its serving base station, such as when the mobile terminal is already engaged in an active call. Also, if the aiding data is broadcast on a periodic basis (perhaps multiplexed with other information services on a common broadcast channel), then the mobile terminal would be forced to wait for the next periodic transmission to receive the needed information.

The mobile terminal could acquire data from the network via a point-to-point connection with the server. A point-to-point connection may satisfy a mobile terminal's immediate need for aiding data, but it also occupies one of a limited number of channels in the communication network. Because available bandwidth is limited, it is desirable to minimize the use of a communication channel for this purpose. From the standpoint of the mobile terminal user, this operation has the advantage of minimizing charges for retrieving aiding data from the network (i.e., per-minute, per-use, or per-bit charges).

BRIEF SUMMARY OF THE INVENTION

The present invention relates to a mobile terminal equipped with a GPS receiver. The mobile terminal uses one or more quality of service (QoS) parameters to determine a desired QoS when the current position of the mobile terminal is requested by an application. The mobile terminal determines whether a position estimate satisfying the desired quality of service can be provided with aiding data currently stored in its memory. If so, the currently-stored aiding data is used by the GPS receiver to determine the current position of the mobile terminal. If the aiding data stored in memory is not sufficient to meet the specified quality of service, the mobile terminal may request aiding data from a remote source, such as a server connected to the public land mobile network. The mobile terminal could also command the GPS receiver to acquire any needed information from GPS satellite signals. By use of the QoS parameter, the present invention avoids unnecessary requests for aiding data, thereby reducing network traffic. Moreover, the present invention reduces charges (i.e. per minute, per use, or per bit charges) incurred by users for retrieving aiding data from the network.

DETAILED DESCRIPTION OF THE INVENTION

The present invention provides a method by which a mobile terminal 100 equipped with a Global Positioning System (GPS) receiver can optimize time for estimating its current position and minimize radio network traffic based on one or more quality of service (QoS) parameters. These QoS parameters may be computed internally within the mobile terminal or received in a position request from the network. The QoS parameter specifies a desired quality of service for computing position estimates. When a position estimate is requested by an application, the mobile terminal 100 determines whether the aiding data currently stored in memory is sufficient to meet the QoS requirements. If so, the mobile terminal 100 searches for and acquires GPS signals, reads the timing data from the transmitted GPS signals, and computes its position. In this case, the mobile terminal 100 does not need to read ephemeris data, almanac data, or other like information which can take several minutes to acquire. If the mobile terminal 100 needs additional information, such as ephemeris data or almanac data to meet the QoS requirement, the mobile terminal 100 may acquire the aiding data either from the network or by reading the needed information from the GPS signals. By limiting unnecessary requests for aiding data, the present invention reduces the time-to-first-fix (TTFF) while, at the same time, avoids generation of unnecessary network traffic.

Figure 1:
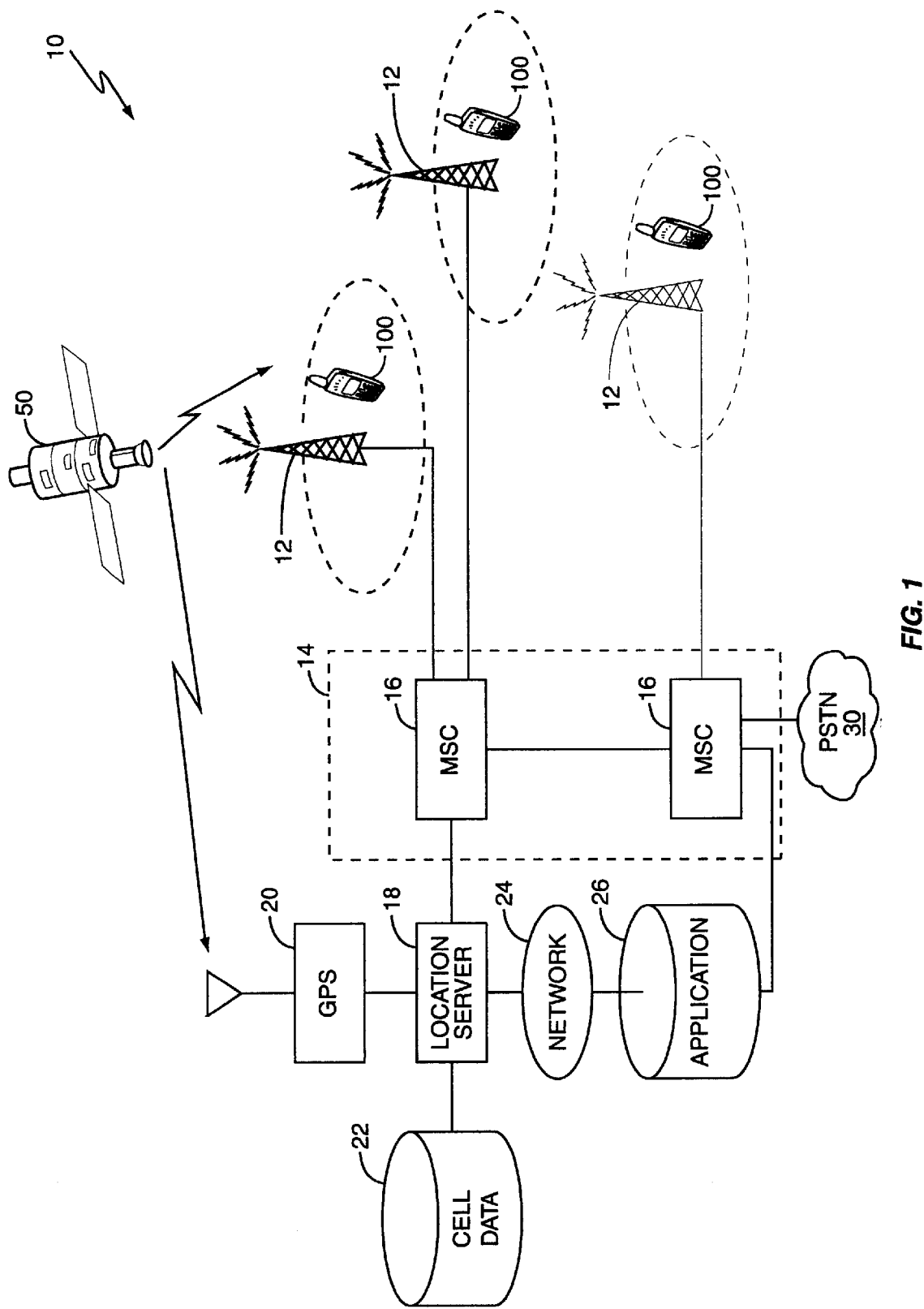
FIG. 1 is a block diagram of a mobile communication network.

FIG. 1 is a block diagram of a mobile communication system, indicated generally by the numeral 10, supporting over-the-air communications with the GPS-equipped mobile terminals 100. The mobile communication system 10 comprises a plurality of mobile terminals 100, a plurality of base stations 12, and a core network 14 comprising one or more mobile switching centers (MSC) 16. Each base station 12 is located in and provides wireless communication services to a geographic region, referred to as a cell. In general, there is one base station 12 for each cell within a given system. Base stations 12 act as an interface between mobile terminals 100 and the mobile communication system 10.

Each base station 12 connects via a dedicated wireline to a MSC 16 in the core network 14. Typically, at least one MSC 16 connects the mobile communication system 10 to an external network 30, such as the Public Switched Telephone System. The MSC 16 providing access to external networks is called a gateway MSC (GMSC). A GMSC may also connect the mobile communication network 10 with other Public Land Mobile Networks (PLMNs). The MSC 16 routes calls to and from the mobile terminal 100 through the appropriate base station 12 or GMSC.

A location server 18 is located in or, alternatively, connects to the core communication network 14. The function of the location server 18 is to provide aiding data to mobile terminals 100 within the mobile communication system 10 when needed to perform position calculations. The location server 18 may capture the aiding data from a variety of sources, including a GPS receiver 20 that is locally attached, as shown in FIG. 1, or that is otherwise accessible through a network. The aiding data includes information broadcast by the satellites 50 in the GPS constellation, including precise orbits (ephemeris) and clock corrections, corrections for ionospheric and propagation delays, and coarse long-term orbits (almanac). The location server 18 may also receive a list of satellites 50 that are visible to GPS receiver 20, as well as accurate time provided by the GPS receiver 20 connected to the location server 18. Furthermore, the location server 18 may have access, either locally or through a network, to a database 22 containing cell position information, which it delivers as aiding data based on the cell identities of requesting mobile terminal 100. Cell location can be used to provide an approximate location of a mobile terminal. Database 22 could also store a list of satellites visible in each cell, which could be provided as aiding data to the mobile terminal 100.

FIG. 1 also shows a positioning application 26 that may be external to the mobile terminal 100, either within or outside of the mobile communication network 10. The positioning applications 26 may, for example, comprise a software program executing on application servers external to the mobile terminal 100. The positioning application 26 could also be executing within the mobile terminal 100 or core network 14. If the positioning application 26 resides outside of the core network 14, it may communicate with the mobile communication system 10 through a gateway MSC 16. In addition, the positioning application 26 may communicate with the location server 18 either through the mobile communication system 10 or through a gateway to an external network 24, such as the Internet or an intranet. An example of a positioning application 26 is a location-dependent information service that provides location specific information (e.g., "the nearest restaurant") to a requesting mobile terminal 100.

Figure 2:
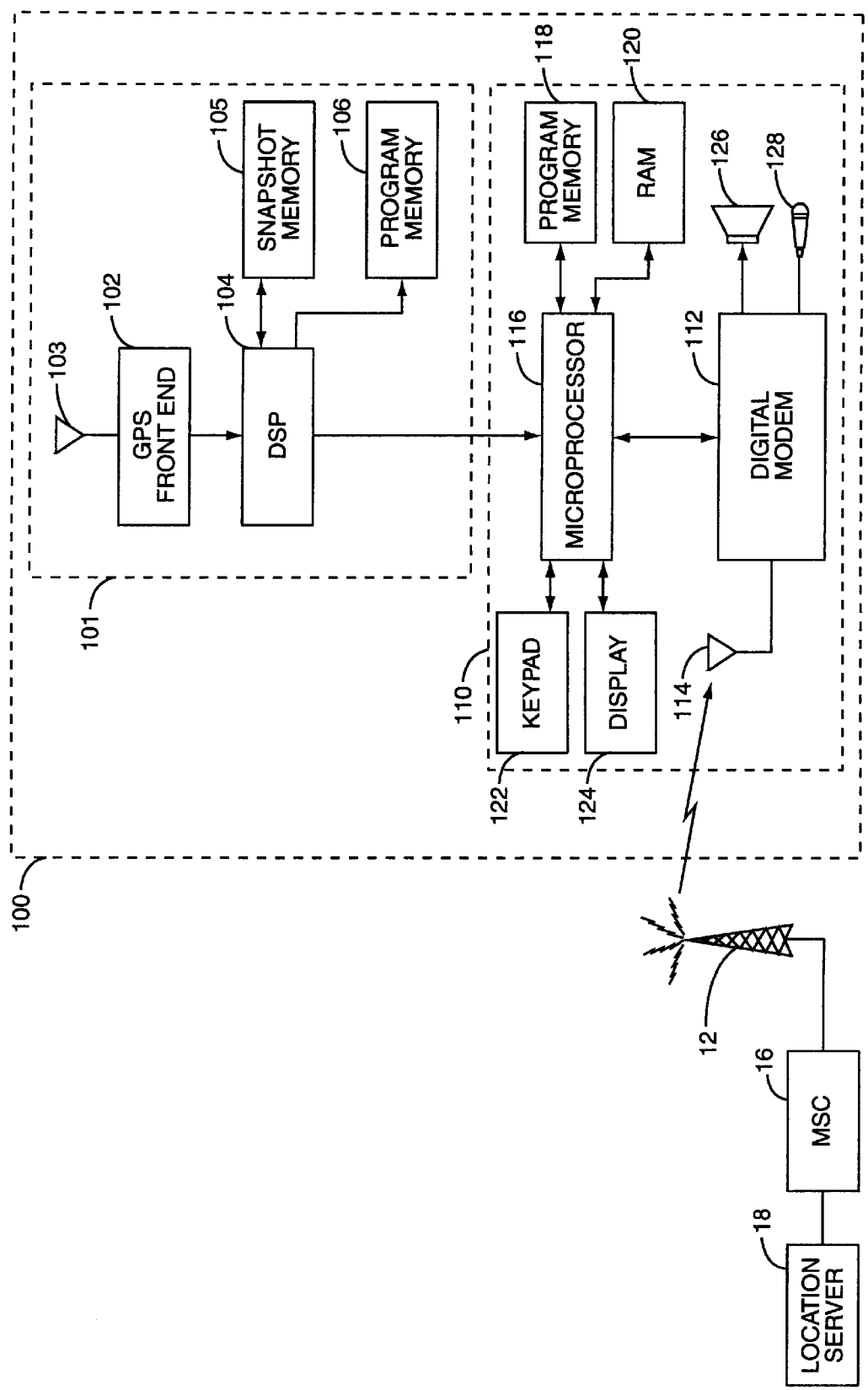
FIG. 2 is a block diagram of a mobile terminal with integrated GPS receiver.

A mobile terminal 100 with integrated GPS receiver is shown in FIG. 2. The mobile terminal 100 comprises a GPS receiver 101 combined with a conventional radio transceiver 110, such as a cellular mobile terminal. The GPS receiver 101 acquires GPS signals from space-based satellites and performs pseudo-range calculations from which the current position of the mobile terminal 100 can be estimated. The radio transceiver 110 provides a means for communicating with the mobile communication network 10.

The GPS receiver comprises a GPS front end 102 coupled to a GPS antenna 103, a digital signal processor (DSP) 104, a data memory 105, and program memory 106. Signals broadcast from GPS satellites 50 are coupled into the GPS front end 102 by GPS antenna 103. The GPS front end 102 performs the functions necessary to receive the broadcast signals and convert them into a digital representation that is suitable for processing by DSP 104. Functions performed by the GPS front end 102 may include, for example, RF down-conversion, demodulation, analog-to-digital conversion, and transmission to DSP 104.

The DSP 104 receives sampled data and processes it using well-known correlation techniques to acquire the pseudo-random noise (PN) codes in the signals received from the respective earth-orbiting satellites. The DSP 104 uses the measured phases of the acquired codes, along with information indicating current precise position and clock timing of the acquired satellites, to compute pseudo-ranges from the receiver to the satellites. The term 'pseudo-range' is used to indicate that the GPS receiver may have a bias in its local clock, which must be resolved in the final position computation of the mobile terminal 100.

Data memory 105 provides temporary data storage for aiding data that is extracted from GPS signals or aiding data received from the network. For purposes of this application, the term "aiding data" means timing data, satellite ephemeris data, almanac data, correction data, position data, and other data used by the GPS receiver 101 to compute pseudo-ranges and/or actual position or data used to acquire satellite signals. Data memory 105 may comprise volatile or non-volatile memory, or same combination thereof. Program memory 106 stores programs necessary for the performance of the GPS receiver 101, including those programs executed by the digital signal processor 104 to process GPS signals and perform pseudo-range and position calculations. Program memory 106 may comprise read-only (ROM) memory or an erasable programmable read-only memory (EPROM).

The radio transceiver 110 comprises a modem 112, antenna 114, microprocessor 116, program memory 118, data memory 120, keypad 122, and display 124. Modem 112 couples to antenna 114 for transmitting signals to and receiving signals from a base station 12 in the core network 14. Modem 112 comprises the RF circuitry and DSP functions needed to communicate with base station 12. Modem 112 is used to acquire aiding data (e.g., satellite ephemeris data and almanac data, etc.) from the mobile communication network 10, as will be hereinafter described. Modem 112 may provide an audio output to a speaker 126 and receive audio input from a microphone 128.

Microprocessor 116 controls the operation of the radio transceiver 110 and implements the communication protocols used by the mobile communication system 10. Programs necessary for the operation of the radio transceiver 110 are stored in program memory 118. Data memory 120, such as a random access memory (RAM), stores temporary data or other data that may change over time. The data stored in data memory 120 may include aiding data, such as satellite ephemeris data, almanac data, and correction data, used by the GPS receiver 101 to compute pseudo-ranges. Alternatively, aiding data can be stored in data memory 105 in the GPS receiver 101. Microprocessor 116 also communicates with the DSP 104 in the GPS receiver 101. Microprocessor 116 may command the GPS receiver 101 to acquire GPS signals or perform pseudo-range or other distance calculations. Microprocessor 116 may also provide aiding data, such as ephemeris data and almanac data, which is stored in its data memory 120 or acquired from the network 10 to the GPS receiver 101 as will be hereinafter described.

Keypad 122 and display 124 provide a user interface allowing the user to interact with the mobile terminal 100. Keypad 122, or other equivalent input device, allows the user to input data and commands. Display 124 provides means to output information to the user.

According to the present invention, a positioning application 26 running either within the mobile terminal 100 itself or in the mobile communication network 10 requests a position update from the mobile terminal 100. Microprocessor 116 determines a desired quality of service (QoS). To make this determination of QoS, microprocessor 116 may, for example, prompt the user with a menu of choices related to desired positioning quality of service (QoS). One such menu could contain selections such as "Most accurate," "Fastest," "Least Expensive." In this example, the user chooses the desired QoS from the menu. Alternatively, the positioning application 26 executing in microprocessor 116 could automatically utilize a default QoS value, which the user has previously chosen for a particular application and stored in data memory 120. The QoS parameters could also be supplied to the mobile terminal 100 by the requesting application. Depending on the desired QoS, the microprocessor 116 may respond in a variety of ways. It may request aiding data from the core network 14, it may provide aiding data stored in its own data memory 120 to the GPS receiver 101 to use in performing position calculations, or it may instruct the GPS receiver 101 to acquire current aiding data from a GPS satellite 50. Alternatively, the microprocessor 116 could simply provide the QoS parameters to the GPS receiver 101 and allow the GPS receiver 101 to determine whether aiding data is needed.

Figure 3:
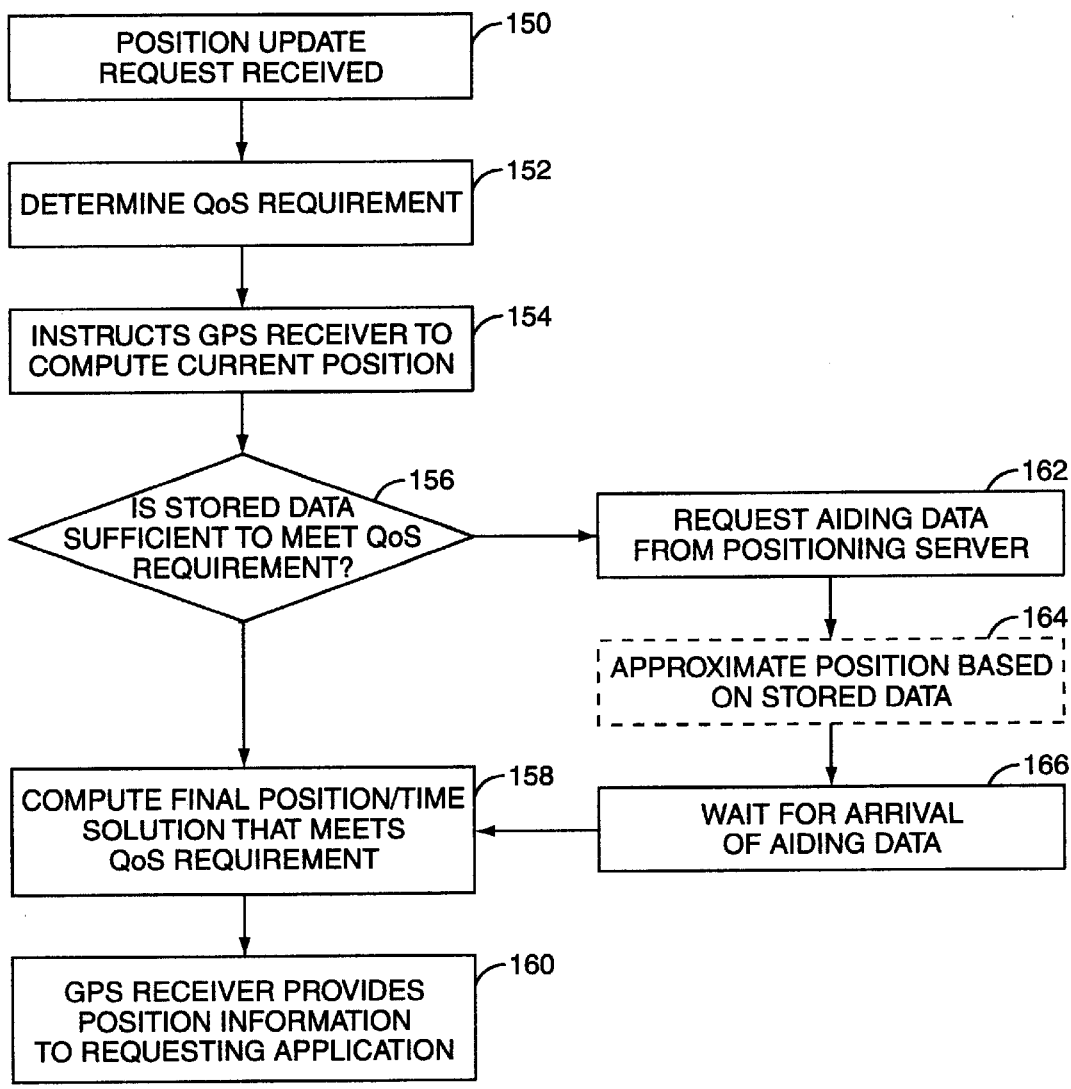
FIG. 3 is a flow chart of a procedure implemented in a mobile terminal for acquiring aiding information according to the invention.

FIG. 3 illustrates an exemplary position update procedure executed by mobile terminal 100. At block 150, a position request for the mobile terminal's current position is received by microprocessor 116. The request could originate with a positioning application 26 running on the mobile terminal 100, or with a positioning application external to the mobile terminal 100. Further, the position request could be responsive to a request by the mobile-terminal 100 for information (e.g. nearest restaurant) or the application 26 could initiate the request on its own to carry out its functions.

In block 152, microprocessor 116 determines the desired quality of service (QoS) for making position estimates. Microprocessor 116 may prompt the user with a menu of choices related to desired QoS. One such menu could contain selections such as "Most accurate," "Fastest," "Least Expensive." The user could then choose the desired QoS from the menu. Alternatively, the positioning application 26 could specify a QoS value in the position request, or a default QoS value stored in the data memory 120 could be used. The default QoS could be used for a single application 26 or for multiple applications.

Once the QoS is determined, the microprocessor 116 instructs GPS receiver 101 to compute the current position of the mobile terminal 100 (block 154) based on the specified QoS. The QoS instructions to the GPS receiver 101 may include simply a QoS class, or microprocessor 116 may translate the QoS selection into accuracy and time-to-first-fix (TTFF) requirements.

Given the QoS requirements, GPS receiver 101, or alternatively the microprocessor 116, estimates if the currently-stored aiding data (e.g., ephemeris, almanac, approximate receiver location, local estimate of GPS time, and availability of differential GPS (DGPS) corrections, etc.) is sufficient to meet the desired QoS requirements (block 156). If the GPS receiver 101 is already operational and producing position/time solutions, then the only evaluated criterion is accuracy. Otherwise, if time-to-first-fix or sensitivity is part of the QoS requirement, then this process may include one or more of the following tests:

1) Determining the age of previously-stored satellite ephemeris data versus current local time;
2) Estimating the accuracy of the local clock, based on expected or maximum drift of the clock since the last accurate position/time solution computed by the GPS receiver 101;
3) Estimating the accuracy of the approximate location based on the amount of time or predicted movement since the last accurate position/time solution computed by the GPS receiver 101. Movement can be predicted by using last known velocity and elapsed time since the last solution or, alternately, by comparing current valves of network parameters (e.g. cell identifier, area identifier, PLMN identifier) with stored values corresponding to the last known location of the mobile terminal 100. Threshold for movement could be detected as a change in one or more of the compared network parameters.

If, in block 156, the GPS receiver 101 or microprocessor 116 determines that the currently-stored aiding data is sufficient to meet the desired QoS, the GPS receiver 101 can optionally use this stored aiding data to acquire the GPS satellite signals and compute a position/time solution (block 158). This position/time solution is then returned to the requesting application (block 160). Alternatively, the task of position/time computation might be performed in the calling application, in which case GPS receiver 101 might return raw positioning data or pseudo-ranges directly to the positioning application 26.

If the GPS receiver 101 or microprocessor 116 determines that currently-stored aiding data is not sufficient to meet the desired QoS requirements, then in block 162 it requests aiding data from the location server 18. After requesting aiding data, GPS receiver 101 or microprocessor 116 then waits for the arrival of this aiding data (block 166). GPS receiver 101 could optionally estimate position based on aged data stored in memory 120 (block 164) and return a preliminary estimate to the requesting application while it awaits arrival of new aiding data (block 166) or keep the estimate locally and update it to a more precise value immediately after receiving the aiding data. For purposes of this application, aged data comprises aiding data that is older than a specified period of applicability. For example, satellite ephemeris may be applicable for a period of four hours. Satellite ephemeris older than four hours would, therefore, constitute aged data. In this manner, the GPS receiver 101 utilizes the existing information to the fullest extent possible while waiting for the up-to-date information from the server. This may include using almanac or aged ephemeris data to acquire and measure satellite signals and compute an approximate position, which does not necessarily meet the final accuracy QoS.

Once GPS receiver 101 or microprocessor 116 has received the new aiding data, it proceeds to compute a final position/time solution that is expected to meet QoS requirements (block 158). For example, new ephemeris may be substituted for the almanac or aged ephemeris to compute the positions of the acquired satellites more accurately. Also, received DGPS corrections may be applied to improve the accuracy of the position/time solution.

After computing a position that meets the required QoS, GPS receiver 101 then provides that position information to the requesting application (block 168) and the process terminates.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a mobile terminal for determining the current position of a mobile terminal, said method comprising:
    receiving a request for said current position of said mobile terminal;
    determining a desired quality of service;
    determining whether aiding data stored in said mobile terminal is sufficient to compute an estimate of said current position meeting said desired quality of service; and
    obtaining additional aiding data from a remote source if said stored aiding data is insufficient to compute said estimate of said current position meeting said desired quality of service.

2. The method of claim 1 wherein obtaining additional aiding data from a remote source comprises obtaining additional aiding data from a mobile communication network.

3. The method of claim 1 wherein obtaining additional aiding data from a remote source comprises obtaining additional aiding data from at least one satellite.

4. The method of claim 1 wherein said additional aiding data comprises time information.

5. The method of claim 1 wherein said additional aiding data comprises satellite ephemeris, almanac data, or correction data.

6. The method of claim 1 wherein said additional aiding data comprises an approximate position of said mobile terminal.

7. The method of claim 1 wherein said additional aiding data comprises a list of satellites visible to said mobile terminal.

8. The method of claim 1 wherein determining a desired quality of service comprises receiving a specified quality of service from a requesting application.

9. The method of claim 1 wherein determining a desired quality of service comprises determining a default setting for said desired quality of service.

10. The method of claim 1 wherein determining a desired quality of service comprises:
    prompting a user to input said desired quality of service; and
    receiving input from said user indicating said desired quality of service.

11. The method of claim 1 further comprising computing said current position of said mobile terminal.

12. The method of claim 11 wherein computing said current position of said mobile terminal comprises computing said current position of said mobile terminal based on said stored aiding data.

13. The method of claim 12 wherein computing said current position of said mobile terminal comprises computing said current position of said mobile terminal based on stored ephemeris data and/or stored time information.

14. The method of claim 13 wherein computing said current position of said mobile terminal comprises computing said current position of said mobile terminal based on aged ephemeris data.

15. The method of claim 11 wherein computing said current position of said mobile terminal comprises computing said current position based on said additional aiding data obtained from said remote source.

16. The method of claim 11 wherein computing said current position of said mobile terminal comprises computing said current position using a last known location of said mobile terminal.

17. A mobile terminal comprising:
    a positioning receiver;
    a processor for computing current position based on navigation signals received by said positioning receiver; said processor programmed to:
        determine a desired quality of service for the computation of current position;
        determine whether aiding data stored in said mobile terminal is sufficient to compute an estimate of said current position meeting said desired quality of service; and
        obtain additional aiding data from a remote source external to the mobile terminal if said stored aiding data is insufficient to compute said estimate of said current position meeting said desired quality of service.

18. The mobile terminal of claim 17 wherein the remote source is a network.

19. The mobile terminal of claim 17 wherein the remote source is a satellite.

20. A system comprising:
    a fixed network;
    a location server connected to said fixed network to capture and store aiding data from a multiplicity of sources; and
    a mobile terminal communicating with the fixed network, said mobile terminal comprising:
        a positioning receiver
        a processor for computing current position based on signals received by said positioning receiver; said processor programmed to:
            determine a desired quality of service for the computation of said current position;
            determine whether aiding data stored in said mobile terminal is sufficient to compute an estimate of said current position meeting said desired quality of service; and
            obtain aiding data from said fixed network if said stored aiding data is insufficient to compute said estimate of said current position meeting said desired quality of service.

* * * * *